US008191114B2

(12) United States Patent
Bardsley et al.

(10) Patent No.: US 8,191,114 B2
(45) Date of Patent: *May 29, 2012

(54) METHODS, SYSTEMS, AND COMPUTER PROGRAM PRODUCTS FOR DETERMINING AN ORIGINATOR OF A NETWORK PACKET USING BIOMETRIC INFORMATION

(75) Inventors: Jeffrey S. Bardsley, Durham, NC (US); Richard M. Horner, Cary, NC (US)

(73) Assignee: Scenera Technologies, LLC, Portsmouth, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/011,381

(22) Filed: Jan. 21, 2011

(65) Prior Publication Data

US 2011/0119376 A1 May 19, 2011

Related U.S. Application Data

(63) Continuation of application No. 11/263,620, filed on Oct. 31, 2005, now Pat. No. 7,890,752.

(51) Int. Cl.
*G06F 15/173* (2006.01)
(52) U.S. Cl. ............. 726/3; 709/224; 713/160; 713/186
(58) Field of Classification Search ...... 726/3; 709/224; 713/160, 186
See application file for complete search history.

(56) References Cited

U.S. PATENT DOCUMENTS

| 5,220,655 | A | 6/1993 | Tsutsui |
| 5,717,860 | A | 2/1998 | Graber et al. |
| 6,018,619 | A | 1/2000 | Allard et al. |
| 6,236,983 | B1 | 5/2001 | Hofmann et al. |
| 6,502,131 | B1 | 12/2002 | Vaid et al. |
| 6,836,799 | B1 | 12/2004 | Philyaw et al. |
| 7,222,360 | B1 * | 5/2007 | Miller ............... 726/3 |
| 7,890,752 | B2 * | 2/2011 | Bardsley et al. ......... 713/160 |
| 2001/0052011 | A1 | 12/2001 | Nagao |
| 2002/0116508 | A1 | 8/2002 | Khan et al. |
| 2002/0143926 | A1 | 10/2002 | Maltz et al. |
| 2003/0018769 | A1 | 1/2003 | Foulger et al. |
| 2003/0187976 | A1 | 10/2003 | Decime |
| 2003/0198190 | A1 | 10/2003 | Rajan et al. |
| 2003/0229692 | A1 | 12/2003 | Vo |
| 2004/0143454 | A1 * | 7/2004 | Kimmel ............ 705/2 |
| 2005/0027806 | A1 | 2/2005 | Schunemann |
| 2005/0063377 | A1 | 3/2005 | Bryant et al. |

OTHER PUBLICATIONS

"DHCP," http://www.webopedia.com/TERM/D/DHCP.html pp. 1-2, Sep. 18, 2003.
"DNS," http://www.webopedia.com/TERM/D/DNS.html pp. 1-4, Sep. 15, 2004.
"Ethereal: A Network Protocol Analyzer," http://www.ethereal.com/ 1 page, Aug. 15, 2005.
"How 802.1x Authentication Works," http://www.computerworld.com, pp. 1-5, Apr. 3, 2003.

(Continued)

Primary Examiner — Kambiz Zand
Assistant Examiner — Aubrey Wyszynski

(57) ABSTRACT

Methods, systems, and computer program products for determining an originator of a network packet using biometric information are disclosed. A network packet is received from a network device. A header or a trailer of the network packet is analyzed to determine whether the header or trailer includes an identifier of biometric identification information of a network user. The network packet is identified as having originated from the network user if the header or trailer includes the identifier of biometric identification information of the network user. Identifying the network packet as having originated from the network user does not require reading a payload of the packet.

20 Claims, 12 Drawing Sheets

OTHER PUBLICATIONS

"IP Address," http://www.webopedia.com/TERM/I/IP_address_html, pp. 1-3, Aug. 12, 2004.
"IP Spoofing," http;//webopedia.com/TERM/I/IP_spoofing.html, pp. 1-3, Sep. 10, 2004.
"MAC Address," http://www.webopedia.com/TERM/M/MAC_address.html pp. 1-3, Aug. 31, 2004.
"NAT," http://www.webopedia.com/TERM/N/NAT.html pp. 1-3, Aug. 17, 2004.

* cited by examiner

TCP Header 207

| Source Port | Destination Port | Sequence Number | Acknowledgement Number | HLEN | Reserved | Code Bits | Window | Checksum | Urgent Pointer | TCP Options | TCP Data |

METHODS, SYSTEMS, AND COMPUTER PROGRAM PRODUCTS FOR DETERMINING AN ORIGINATOR OF A NETWORK PACKET USING BIOMETRIC INFORMATION

RELATED APPLICATIONS

The present application is a continuation of U.S. patent application Ser. No. 11/263,620, entitled "Methods, systems, and computer program products for ASSOCIATING AN ORIGINATOR OF A NETWORK PACKET WITH THE NETWORK PACKET USING BIOMETRIC INFORMATION," filed Oct. 31, 2005, now U.S. Pat. No. 7,890,752, which is commonly owned with this application and the entire disclosure of which is incorporated herein by reference.

TECHNICAL FIELD

The subject matter described herein relates to methods, systems, and computer program products for associating an originator of a network packet with the network packet. More particularly, the subject matter described herein relates to methods, systems, and computer program products for determining an originator of a network packet using biometric information.

BACKGROUND

In communications networks, network packets are sent and received by network components. Network packets may be intercepted in transit over a network for the purpose of network traffic monitoring and analysis. A network manager may utilize the network traffic analysis data for managing the network to keep network packet traffic flowing efficiently.

Network analysis equipment and software have been developed for intercepting network packets and performing monitoring, analysis and reporting functions based on the intercepted packets. An example of network analysis equipment or software that monitors and analyzes network traffic is known as a sniffer. A sniffer may capture packets, and the packets may be analyzed to detect bottlenecks and other network problems. A sniffer may be implemented in a network router. A typical network router reads every packet of data passed to it, and determines whether it is intended for a destination within the router's own network or whether it should be passed further along the network. A router with a sniffer may be able to read the data in the packet as well as the source and destination addresses.

A sniffer may display captured network data to a network manager via a graphic user interface (GUI). However, conventional sniffers may only recognize packet address information. These tools may not provide identification of the network user that is the source of the captured network packet. Further, MAC and IP address may be spoofed by an originator of network traffic. In the case of spoofing, the network manager would be unable to determine the source equipment of the network traffic. It may be advantageous for a network administrator to be able to more effectively associate network traffic with the network user that originated the network packet.

Accordingly, there exists a need for improved methods, systems, and computer program products for associating an originator of a network packet with the network packet.

SUMMARY

According to one aspect, the subject matter described herein includes a method for associating an originator of a network packet with the network packet using biometric information. Biometric information may include human body characteristic data such as fingerprints, eye retinas and irises, facial patterns, voice patterns, hand measurements or other human body characteristics that are suitable for authenticating or identifying a network user. The method may include identifying biometric identification information for a network user. The biometric identification information may be associated with a header, trailer or other portion of a network packet originated by the network user. The network packet may be sent over a network. Network components receiving the network packet may associate the originator of the network packet with the network packet by using the identified biometric identification information.

The subject matter described herein can be implemented as a computer program product comprising computer executable instructions embodied in a computer readable medium. Exemplary computer readable media suitable for implementing the subject matter described herein include disk memory devices, chip memory devices, application specific integrated circuits, programmable logic devices, and downloadable electrical signals. In addition, a computer program product that implements the subject matter described herein may be located on a single device or computing platform. Alternatively, the subject matter described herein can be implemented on a computer program product that is distributed across multiple devices or computing platforms.

BRIEF DESCRIPTION OF THE DRAWINGS

Exemplary embodiments of the subject matter will now be explained with reference to the accompanying drawings, of which:

FIG. 2B is a representation of an exemplary transmission control protocol (TCP) header that includes biometric identification information according to an embodiment of the subject matter described herein;

DETAILED DESCRIPTION

Figure 1:
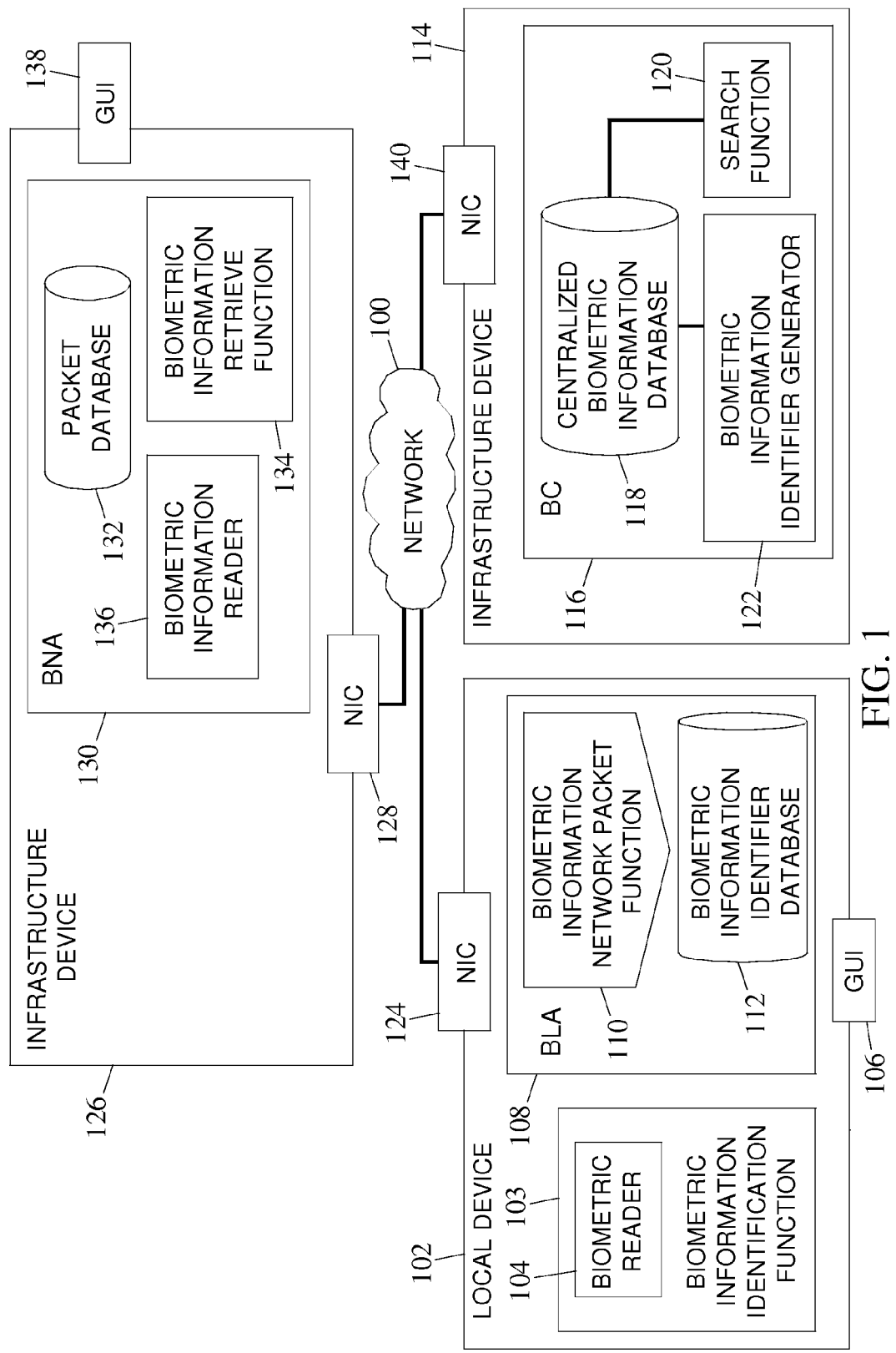
FIG. 1 is a communications network including network components for associating an originator of a network packet with the network packet using biometric identification information according to an embodiment of the subject matter described herein.

According to one aspect, a system for associating an originator of a network packet with the network packet using biometric identification information may be implemented as hardware, software, and/or firmware components executing on one or more network components in a communications network. FIG. 1 illustrates an example of a communications network 100 including network components for associating an originator of a network packet with the network packet using biometric identification information according to an embodiment of the subject matter described herein. Communications network 100 may be any suitable network for exchanging network packets between components. Referring to FIG. 1, network 100 includes means for identifying biometric identification information for a network user. For example, a local device 102 of network 100 may include a biometric information identification function 103 for identifying biometric information for a network user. According to one embodiment, function 103 may include a biometric reader 104 for obtaining the biometric identification information from the network user when the network user logs onto device 102 by entering user credentials such as a login ID and a password. When logging onto device 102, the network user may be prompted by a GUI 106 to provide biometric identification information.

Biometric reader 104 is operable to receive, measure and/or analyze biological identification information for a network user. Biological identification information may include human body characteristics such as fingerprints, eye retinas and irises, facial patterns, voice patterns, hand measurements and other suitable human body characteristics that are suitable for authentication purposes. In one example, biometric reader 104 may be a fingerprint scanner for obtaining identification data based on a fingerprint of a network user. In an alternate example, biometric reader 104 may be a retinal or iris scanner for obtaining identification data based an eye retina or iris of a network user. In still another alternate example, biometric reader 104 may be a camera and facial pattern analyzer for obtaining facial pattern data of a network user. In yet another alternate example, biometric reader 104 may be a sound recorder for obtaining data of a network user's voice patterns. In yet another alternative example, biometric reader 104 may be a hand measurement device for obtaining hand measurements of a network user. After obtaining data related to human body characteristics, the data may be converted to computer readable form and stored in local device 102.

According to one embodiment, biometric information identification function 103 may not include biometric reader 104. Biometric information identification function 103 may receive a network user's biometric identification information from another source. For example, a biometric reader may be separate from local device 102 and may be used for receiving, measuring and/or analyzing biological identification information for the network user. Alternatively, the biometric data can be pre-stored in a database that is part of local device 102 or is available to device 102 via network 100, and can be accessed by biometric information identification function 103 for identifying biometric information for a network user.

Local device 102 also includes means for associating the identified biometric identification information with a header, trailer, payload, or other portion of a network packet originated by the network user. For example, when a network user operates device 102, one or more network packets may be generated for communication on network 100. Biometric identification information may be associated with a header, trailer, payload, or other portion of a network packet in order to associate an originator of the network packet with the network packet. The originator of a network packet may be the network user operating the network component from which the network packet originated. As referred to herein, the network packet header may be a header of any non-application layers such as layer 2, 3, or 4 of the Open Systems Interconnection (OSI) communication model.

Local device 102 includes a biometricinformatic local agent (BLA) 108 including functions for associating an originator of a network packet with the network packet using biometric information. BLA 108 includes a biometric information network packet function 110 operable to associate the network user's biometric identification information with a network packet originated by the network user. In particular, when communicating with network 100, local device 102 may generate network packets for communication on network 100. The network packets may be generated while device 102 is being used by the network user. In one embodiment, function 110 may insert a biometric information identifier in a header or trailer, payload, or other portion of a network packet. The biometric information identifier may be used by network components for linking the network packet to biometric identification information for the network user originating the network packet. In an alternate embodiment, rather than inserting an identifier, function 110 may insert the network user's biometric identification information in a header, trailer, payload, or other portion of a network packet. Since biometric identification information, such as retinal scan data may be too large for inclusion in a header or trailer of a network packet, a hash function may be used to compute a unique data value based on the biometric identification information, and the unique data value may be inserted in the header or trailer of the network packet. In yet another embodiment, function 110 may insert biometric identification information in the payload of the network packet and insert a biometric information identifier in the network packet's header for indicating that the biometric identification information is in the payload.

As stated above, in one embodiment, a biometric information identifier is inserted in the packet and may be used by network components for linking the network packet to biometric identification information for the network user originating the network packet. For example, the biometric information identifier may link to a centralized biometric information database (described below) that stores biometric identification data for the network user. BLA 108 may include a biometric information identifier database 112 having entries with a biometric information identifier for linking a network packet header to biometric identification information of the originator of the network packet. Entries of database 112 may also include credentials of the network user. Examples of credentials may include a login ID and a password. Database 112 may also include contact information for the network user and associated with the biometric data so that the network user can be contacted. Contact information may include e-mail addresses, instant messaging (IM) addresses, phone numbers, and the like.

Network 100 may include an infrastructure device 114 for maintaining and storing biometric identification information and biometric information identifiers for network users. For example, device 114 may include a biometricinformatic coordinator function 116 for maintaining a centralized biometric information database 118 that stores biometric identification information and biometric information identifiers. Database 118 may also store user credentials and contact information as described above. Database 118 may include biometric identification information for the originator of network packets communicated from device 102. Further, database 118 may include a biometric information identifier associated with the biometric identification information. As stated above, the biometric information identifier may be inserted into a network packet for linking the network packet to biometric identification information for the originator of the network packet. For example, network components receiving network packets including a biometric information identifier may communicate a request including the identifier to device 114 for searching database 118 based on the identifier. A search function 120 may search database 118 for biometric identification information associated with the identifier. When biometric identification information associated with the identifier is found, the biometric identification information may be sent to the network component requesting the search. The biometric identification information may be displayed on the requesting network component so that the operator may associate the network packet with the network user originating the network packet.

Biometric information database 118 may receive biometric identification information from components of network 100 and generate links to the biometric identification information to be included in the network packets. For example, when biometric identification information is obtained at local device 102, the biometric identification information may be sent to infrastructure device 114. On receiving the biometric identification information, a biometric information identifier generator 122 may generate a unique biometric information identifier for the received biometric identification information. The biometric identification information and associated identifier may be stored in an entry in database 118. Further, the biometric information identifier may be sent to the network component that communicated the biometric identification information to device 114. The network component may receive the biometric information identifier and insert the network user identifier in network packets originated by the network user. In the example of biometric identification information being sent by local device 102 to device 114, device 114 may generate a biometric information identifier for the user of device 102 and send the biometric information identifier to device 102. Device 102 may insert the biometric information identifier in network packets sent by the network user to network 100. Network components receiving the message may read the biometric information identifier and request biometric identification information from device 114 based on the biometric information identifier.

As described above, existing protocol header fields, frame fields, and trailer fields may be used for placement of biometric identification information. To facilitate the placement of biometric identification information within existing packet formats, the following examples should provide appropriate guidance. FIGS. 2A-2F show potential locations for placement of biometric identification information within existing protocol headers, frames, and trailers. Use of these fields should not require modification of the exemplary protocols.

Figure 2A:
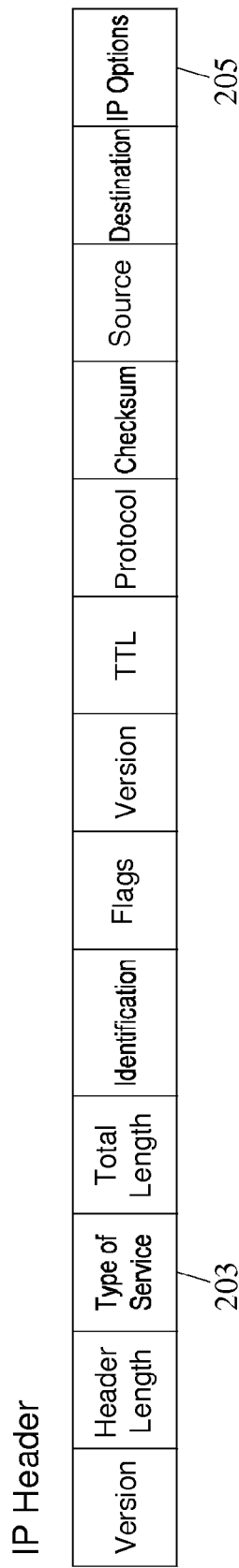
FIG. 2A is a representation of an exemplary IP header that includes biometric identification information according to an embodiment of the subject matter described herein.

For example, FIG. 2A illustrates a representation of an exemplary IP header 201. Type-of-service field 203 and IP-options field 205 may both be used as a location for placement of biometric identification information without modification to the protocol itself.

FIG. 2B illustrates a representation of an exemplary TCP header 207. TCP-options field 209 may be used within TCP header 207 as a location for placement of biometric identification information.

Figure 2C:
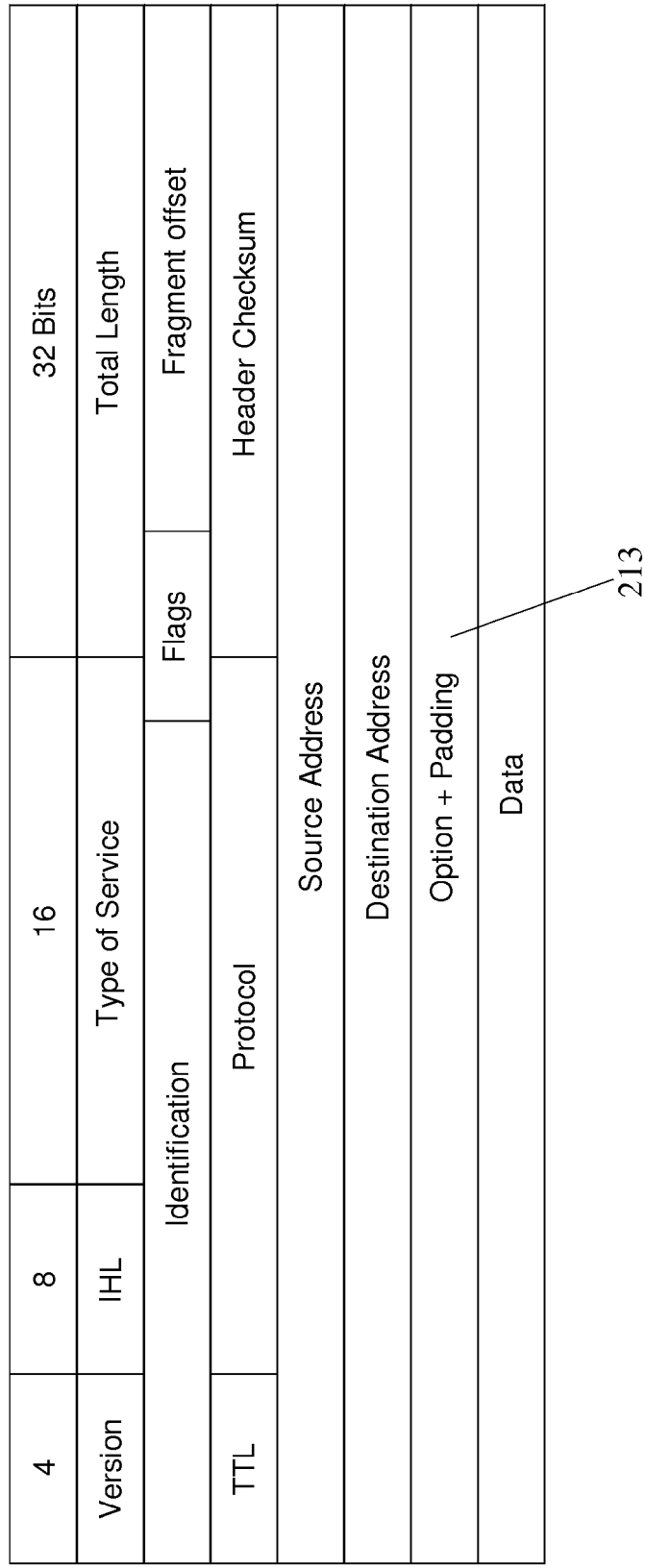
FIG. 2C is a representation of an exemplary IP version 4 (IPv4) frame that includes biometric identification information according to an embodiment of the subject matter described herein.

FIG. 2C illustrates a representation of an exemplary IP version 4 IPv4 frame 211. An "option+padding" field 213 of IPv4 Frame 211 may be used as a location for placement of biometric identification information.

Figure 2D:
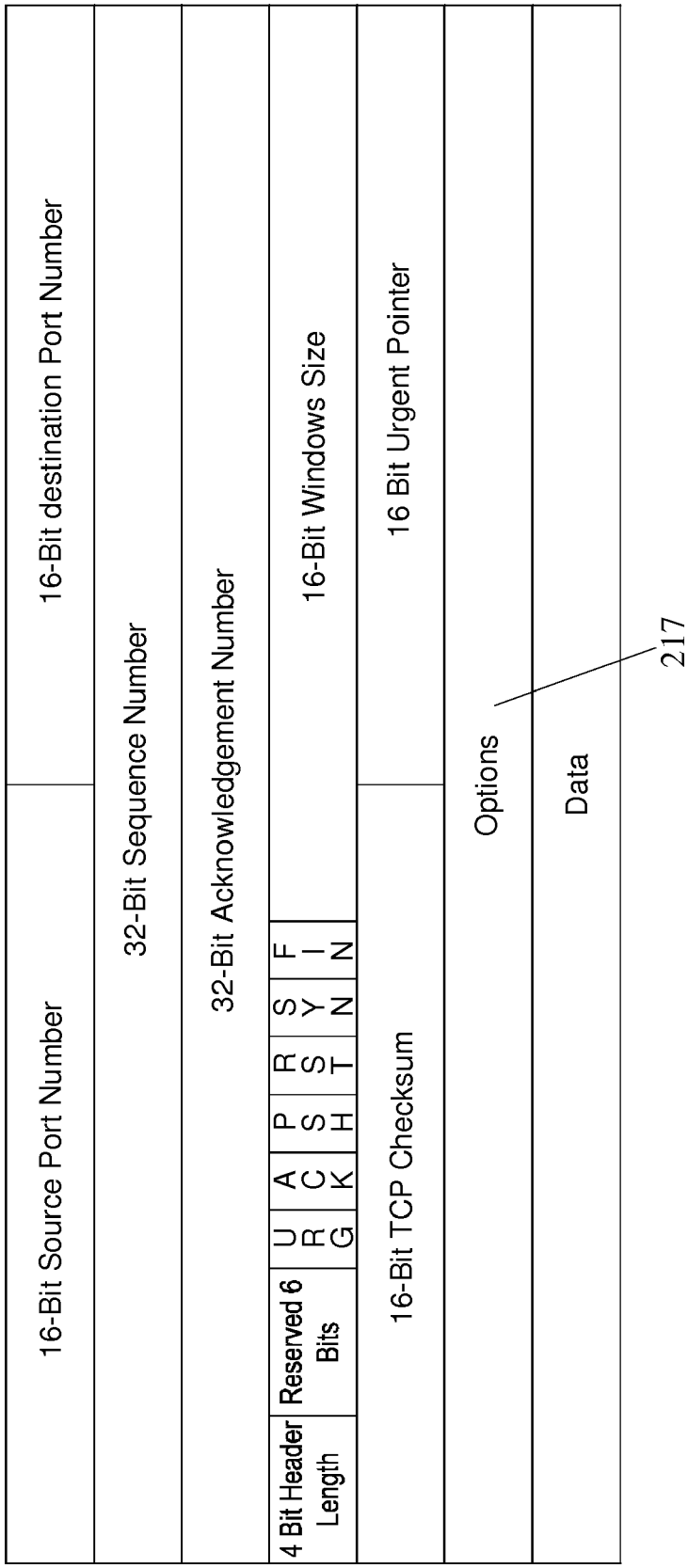
FIG. 2D is a representation of an exemplary TCP frame that includes biometric identification information according to an embodiment of the subject matter described herein.

FIG. 2D illustrates a representation of an exemplary TCP frame 215. An operations field 217 of TCP frame 215 may be used as a location for placement of biometric identification information. For the case of a TCP options field being used to carry biometric identification information, there are two options for the format of that option field. The first may be a single octet (8 bits) of option kind, and a second may be an octet of option kind followed by an octet of option length and then the actual option data octets.

Figure 2E:
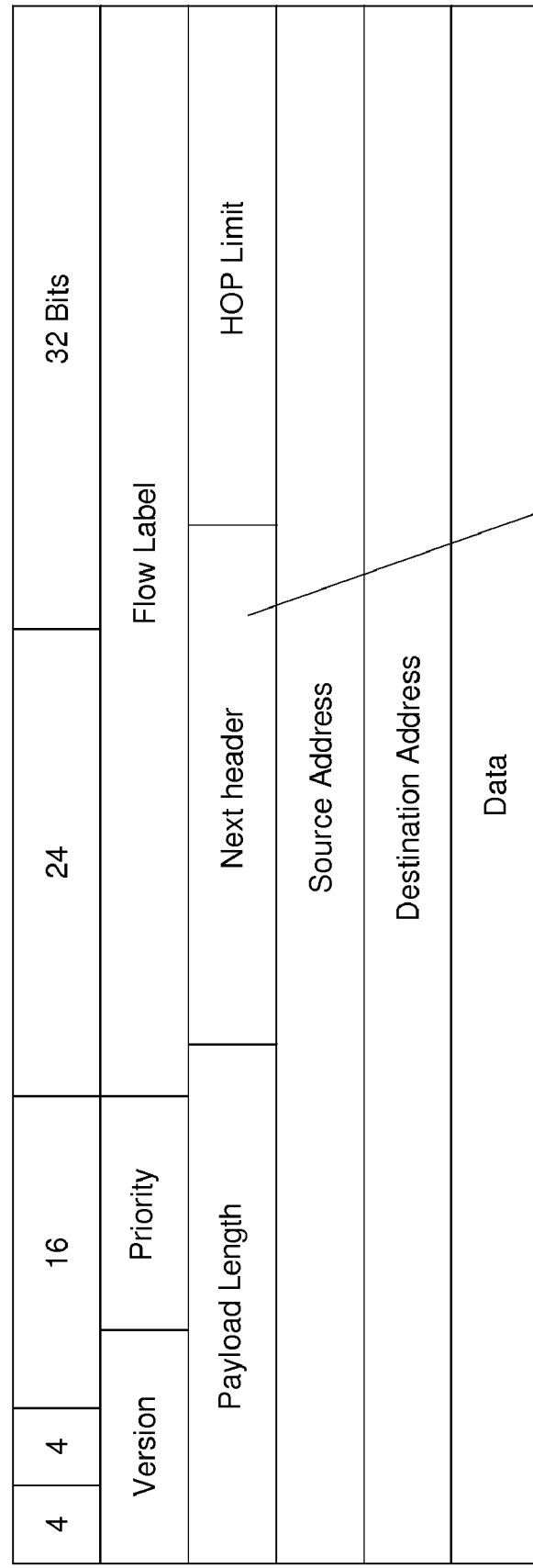
FIG. 2E is a representation of an exemplary IP version 6 (IPv6) frame that includes biometric identification information according to an embodiment of the subject matter described herein.

FIG. 2E illustrates a representation of an IPv6 datagram/frame 219. Next-header field 221 may be used for insertion of biometric identification information. In IPv6, datagrams/frames may allow for as many additional header fields as a user may desire. Because the extension headers are usually examined by a destination node only, they are well suited for deployment of biometric identification information. An exception to this rule is the hop-by-hop options header which carries optional information that must be examined by every node along the path of the datagram/frame.

Figure 2F:
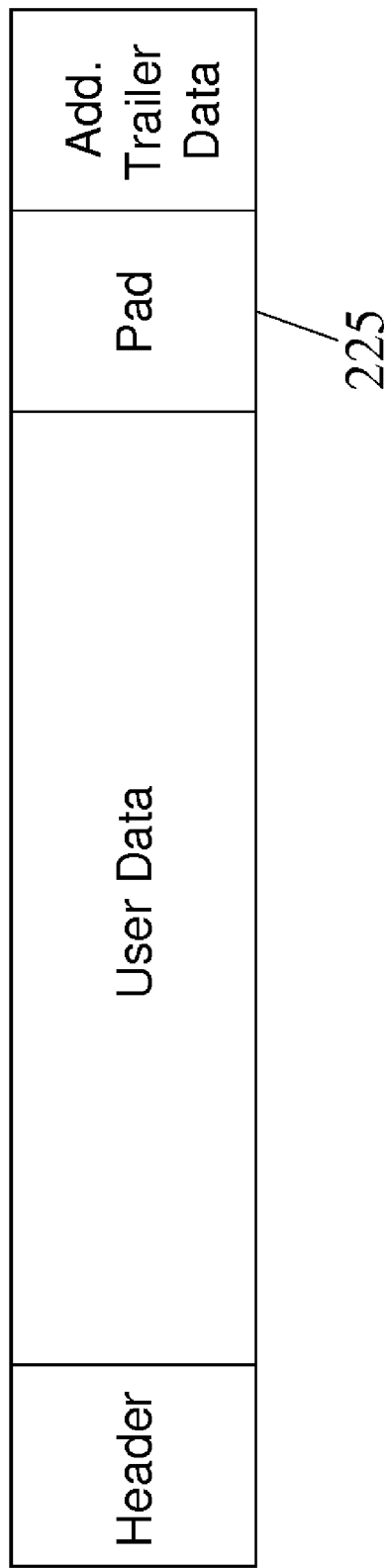
FIG. 2F is a representation of an asynchronous transfer mode (ATM) cell that includes biometric identification information according to an embodiment of the subject matter described herein.

FIG. 2F illustrates a representation of an ATM cell 223. A pad field 225 may be used for insertion of biometric identification information. The pad field may be in a trailer portion of the ATM cell and used for padding the user data.

Local device 102 includes a means for sending network packets over a network. For example, device 102 includes a network interface card (NIC) 124 that is operable to transmit network packets over network 100. Local device 102 communicates with network 100 by sending and receiving network packets. As stated above, function 110 may insert a biometric information identifier for the originator of a network packet into the network packet. The packet including the biometric information identifier may be sent over network 100 via NIC 124.

As stated above, local device 102 may send network packets including a biometric information identifier over network 100. Network 100 includes components for intercepting a network packet including the identifier and requesting biometric identification information associated with the identifier. The biometric identification may be used to associate an originator of the network packet with the network packet. For example, an infrastructure device 126 of network 100 may include a NIC 128 connected to network 100 for intercepting network packets sent by device 102. Device 126 may include a biometricinformatic network agent (BNA) 130 for storing the data of received packets in a packet database 132. Further, BNA 130 may include a biometric information retrieve function 134 for reading a biometric information identifier from an intercepted network packet and retrieving biometric identification information based on the biometric information identifier. In particular, function 134 may communicate a request message to device 114 via network 100 for requesting biometric identification information corresponding to the biometric information identifier read from the packet. The request message may include the biometric information identifier and instructions to return biometric identification information corresponding to the biometric information identifier stored in database 118. As stated above, device 114 may include search function 120 for searching database 118 for biometric identification information based on the biometric information identifier. When the biometric identification information is retrieved from database 118, device 114 may generate a response message including the biometric identification information and communicate the response to device 126. With the biometric identification information, an operator of device 126 may be able to associate the network packet with the biometric identification information of the network user that originated the network packet.

Device 126 includes a biometric information reader 136 for reading the biometric identification information contained in the response message sent by device 114. Biometric information reader 136 may be any suitable device for reading biometric identification information and presenting the biometric identification information to an operator of 102 via GUI 138. In one example, biometric identification information reader 136 may be operable to receive fingerprint data and display the data with GUI 138. In an alternate example, biometric identification information reader 136 may be operable to receive eye retina or iris data and display the data with GUI 138. In still another alternate example, biometric identification information reader 136 may be operable to receive facial pattern data and display the data with GUI 138. In yet another alternate example, biometric identification information reader 136 may be operable to receive voice pattern data and play the voice pattern data as sound with GUI 138. The operator of device 124 may be able to associate a received network packet with a network user based on the biometric identification information displayed via GUI 138.

According to one embodiment, an action may be performed in the network based on biometric identification information read from a sent packet. According to one embodiment, device 126 may send a notification, such as a message to device 102, for indicating receipt of a network packet associated with the network user. According to another embodiment, device 126 may log the biometric identification information in a log file. According to yet another embodiment, device 126 may perform packet traffic analysis based on the biometric identification information. An example of packet traffic analysis may include determining the number of packets communicated per user. In another embodiment, device 126 may establish a communication session with a network component having an address associated with the biometric identification information. The communication session with the network component may involve a call, e-mail, or IM. In another embodiment, the biometric identification information may be removed from the network packet. In yet another embodiment, a biometric information identifier in a sent packet may be removed from the sent packet. In another embodiment, biometric identification information may be removed from the network packet. In another embodiment, device 126 may set an alarm to notify a network component operator of receipt of a network packet associated with the network user. Biometric information retrieve function 134 may include functionality for performing one or more of these actions based on biometric identification information read from a sent packet.

Devices 102, 114, and 126 may each be any suitable component operating in a communications network. For example, local device 102 may be a PC, a telephone, or a personal digital assistant (PDA). Further, for example, infrastructure device 114 may be an authentication server. Infrastructure device 126 may be an intrusion detection system (IDS), a gateway, or a firewall. In addition, although devices 102, 114 and 126 are shown as separate devices in FIG. 1, the functions provided by two or more of these devices may be implemented on a single device or computing platform without departing from the scope of the subject matter described herein. For example, the functions provided by devices 114 and 126 may be implemented on a single platform that intercepts packets, identifies biometric identification information associated with the packets, and that performs a security action based on the biometric information. The security action may include displaying biometric identification information to the operator or setting an alarm to notify the operator of that a network packet associated with the network user has been received.

Figure 3:
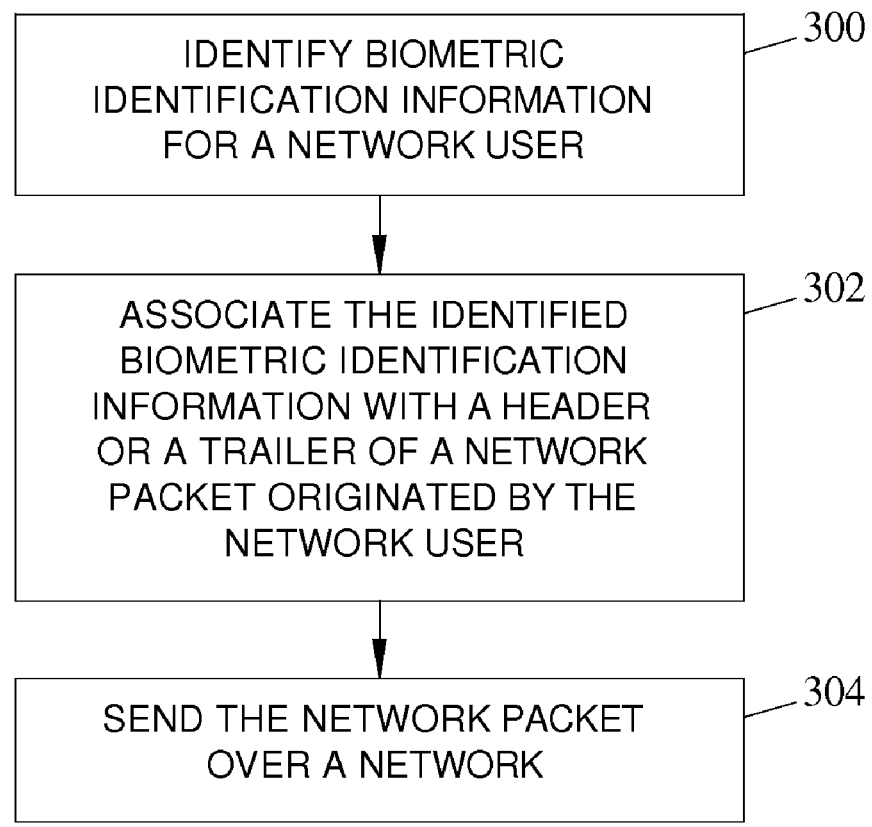
FIG. 3 is a flow chart of an exemplary process for associating an originator of a network packet with the network packet using biometric information according to an embodiment of the subject matter described herein.

FIG. 3 is a flow chart illustrating an exemplary process for associating an originator of a network packet with the network packet using biometric information according to an embodiment of the subject matter described herein. Referring to FIG. 3, in block 300, biometric identification information may be identified for a network user. In one embodiment, a biometric reader may obtain biometric identification information from a network user, and the information associated with a biometric information identifier. In block 302, the identified biometric identification information may be associated with a header or a trailer of a network packet originated by the network user. In one embodiment, a biometric information identifier associated with a network user's biometric identification information may be inserted into a header or a trailer of a network packet originated by the network user. In block 304, the network packet may be sent over a network. Thus, in this exemplary process, biometric information is used to associate the network user with a network packet originated by the network user.

Figure 4A:
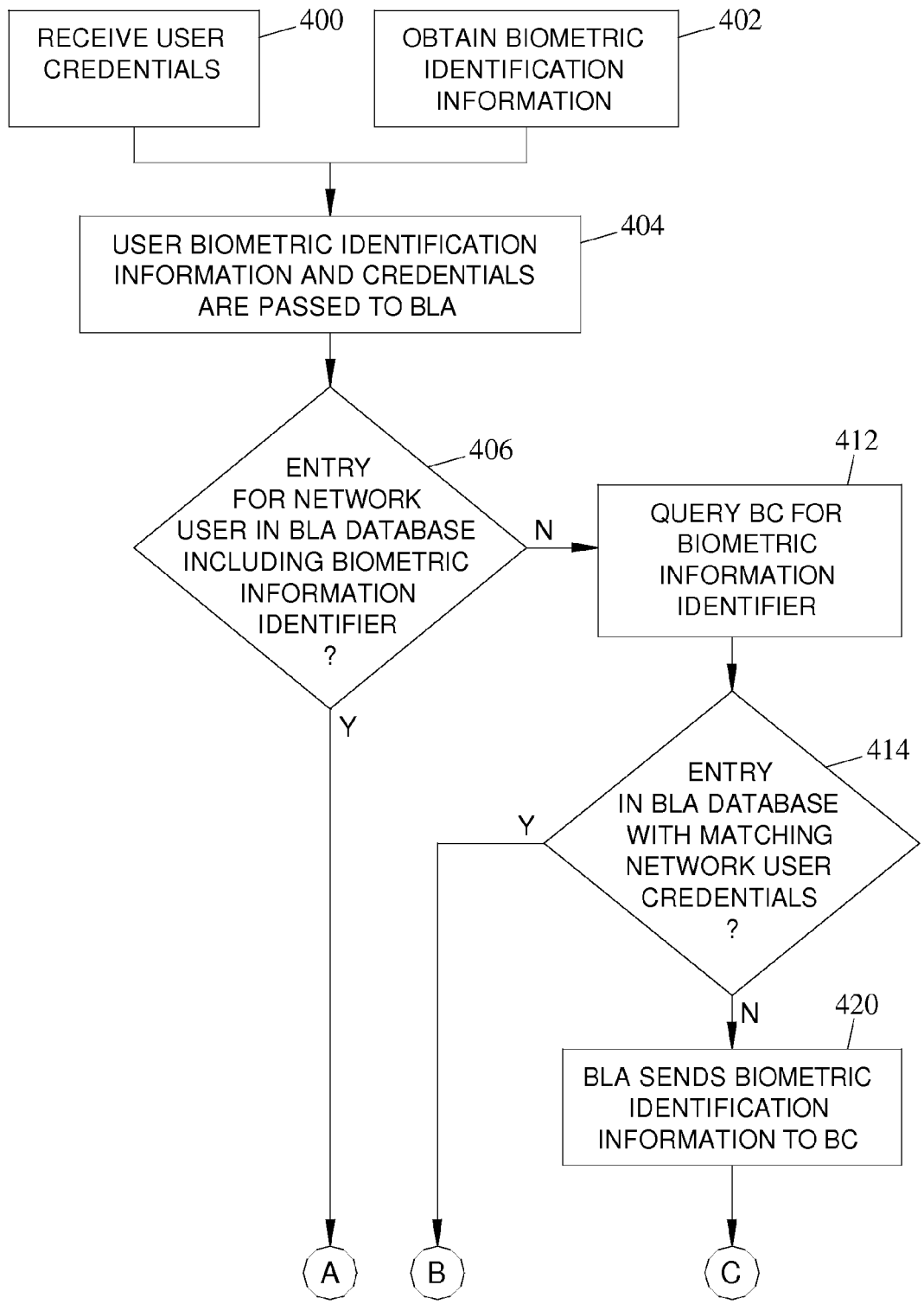
FIGS. 4A and 4B are a flow chart of another exemplary process for associating an originator of a network packet communicated in the network shown in FIG. 1 with the network packet using biometric identification information according to an embodiment of the subject matter described herein.
Figure 4B:
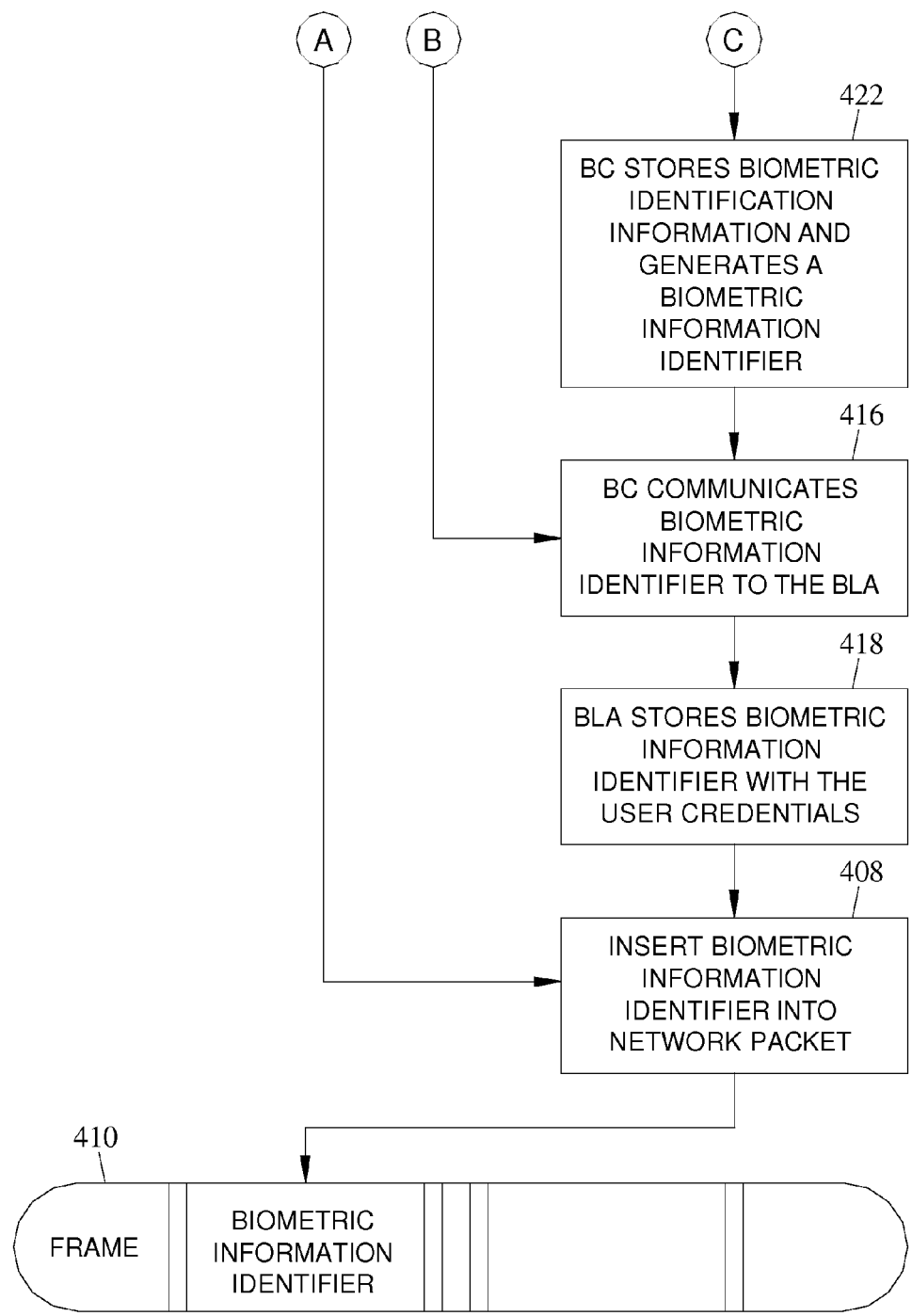

FIGS. 4A and 4B are a flow chart illustrating another exemplary process for associating an originator of a network packet communicated in network 100 shown in FIG. 1 with the network packet using biometric identification information according to an embodiment of the subject matter described herein. Referring to FIG. 4A, in block 400, local device 102 may receive user credentials, such as a login ID and a password, from a network user. Local device 102 may include a GUI 106 for interfacing with the network user to receive user credentials. In block 402, biometric reader 104 receives biometric identification information from the network user. In block 404, the user credentials and biometric identification information are passed to BLA 106.

User credentials and biometric identification information for a network user may be stored in database 112. In block 406, BLA 106 may determine whether database 112 includes an entry for the network user that includes a biometric information identifier. Database 112 may be searched based on the network user's user credentials to determine if the entry exists. If an entry exists that includes a biometric information identifier for the network user, function 110 may insert the biometric information identifier for the network user into network packets sent by device 102 onto network 100 (block 408). For example, referring to FIG. 4B, a biometric information identifier for the network user may be inserted into a header of network packet 410 sent over network 100. The biometric information identifier may be used to associate an originator of network packet 410 with packet 410 using biometric identification information.

Table 1 below shows an exemplary entry including a network user's user credentials and a biometric information identifier that may be stored in database 112.

TABLE 1

Exemplary Entry Data in Biometric Information Identifier Database

| User Credentials | | Biometric Information |
|---|---|---|
| Login ID | Password | Identifier |
| JohnSmith | Password123 | 1234567890 |

In Table 1, user credentials for the exemplary entry includes a login ID and password. Alternatively, the user credentials may be any other suitable type of credentials that a network user may enter when operating a network device. The biometric information identifier may be a number or other suitable identifier for uniquely identifying an identifier to biometric identification information for the network user.

Referring again to block 406 of FIG. 4A, if database 112 does not include an entry for the network user that includes a biometric information identifier, BLA 108 may query BC 116 for a biometric information identifier for the network user (block 412). The query may be sent by device 102 to device 114 via network 100 and contain the network user's credentials. BC 116 may determine whether database 118 has an entry with matching network user credentials (block 414). For example, search function 134 may search database 118 for an entry having matching network user credentials.

In block 414, if it is determined that database 118 has an entry with matching network user credentials for the network user, BC 116 may communicate the biometric information identifier in the entry to BLA 108 (block 416). BLA 106 may store the biometric information identifier with the network user's user credentials in an entry in database 112 (block 418). The biometric information identifier may then be inserted into a header of network packet 410 originated by the network user (block 408).

Referring again to block 414 of FIG. 4A, if it is determined that database 118 does not have an entry with matching network user credentials for the network user, BLA 108 may send biometric identification information for the network user to BC 116 (block 420). BC 116 may store the received biometric identification information in database 118. Further, generator 122 may generate a unique biometric information identifier for linking the network user to the biometric identification information (block 422). Again referring to block 416, BC 116 may communicate the biometric information identifier for the network user to BLA 108 via a NIC 140. BLA 108 may store the biometric information identifier with the network user's user credentials in an entry in database 112 (block 418). The biometric information identifier may then be inserted into a network packet originated by the network user (block 408). The biometric information identifier in a network packet may be used by components of network 100 to associate the originator of the network packet with the network packet using biometric identification information.

Figure 5:
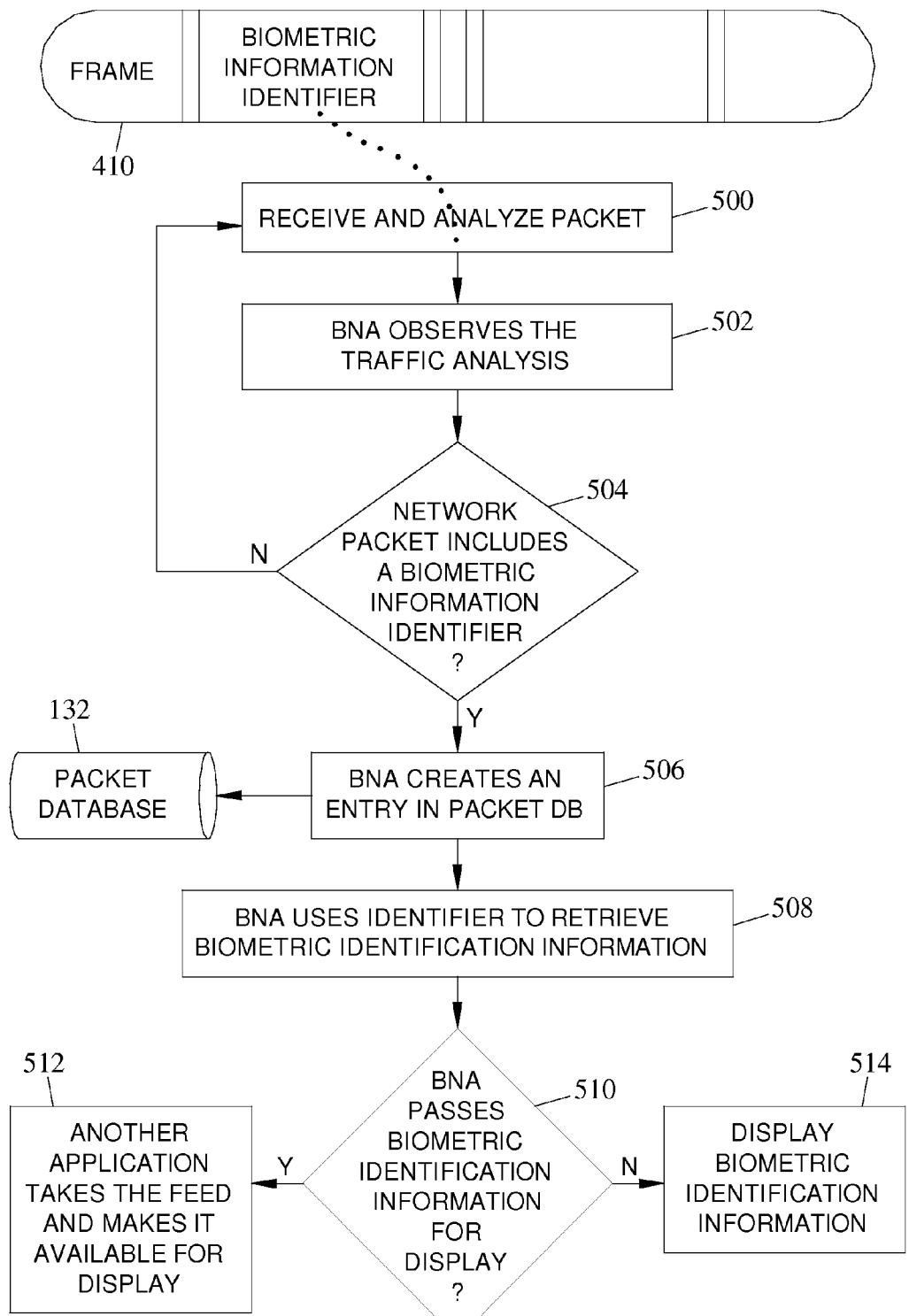
FIG. 5 is a flow chart of an exemplary process for detecting a network packet associated with biometric identification information of an originator of the network packet according to an embodiment of the subject matter described herein.

FIG. 5 is a flow chart illustrating an exemplary process for detecting a network packet associated with biometric identification information of an originator of the network packet according to an embodiment of the subject matter described herein. As noted above, network packet 410 may be communicated over network 100 and include a biometric information identifier for linking packet 410 to biometric identification information for the originator of packet 410. Referring to FIG. 5, in block 500, device 126 shown in FIG. 1 may receive and analyze network packet 410. For example, device 126 may perform analysis operations such as network traffic sniffing. At block 502, biometric information retrieve function 134 may observe packet 410 to scan for a biometric information identifier. In one example, packet analysis data is forwarded to a log file, and function 134 scans the log file for one or more biometric information identifiers contained in the log file.

Referring to block 504, function 134 determines whether packet 410 includes a biometric information identifier. If it is determined that a network packet does not include a biometric information identifier, device 126 receives and analyzes packets (block 500). Otherwise, at block 504, if it is determined that a network packet includes a biometric information identifier, BNA 130 creates an entry in packet database 132 (block 506). The entry may include the biometric information identifier and other suitable data from the network packet. For example, the entry may include a network packet's source address, destination address, or protocol type.

Table 2 below shows an exemplary entry in database 132.

TABLE 2

Exemplary Entry Data in Packet Database

| Network Packet Data | | Biometric Information |
|---|---|---|
| Source Address | Destination Address | Identifier |
| 1.234.56.789 | 1.123.45.456 | 1234567890 |

In Table 2, the exemplary entry includes the network packet's source and destination addresses. In addition, the entry includes the biometric information identifier contained in the packet.

In block 508, BNA 130 may use the biometric information identifier for retrieving the biometric identification information stored in database 118. For example, function 134 may generate a request message including the biometric identification information and communicate the request message to device 114. The request message instructions to return biometric identification information corresponding to the biometric information identifier stored in database 118. BNA 130 may receive the biometric identification information from device 114.

In block 510, BNA 130 determines whether to pass the received biometric identification information to another application for display to the operator of device 126. If it is determined to pass the received biometric identification information to another application for display, the biometric identification information can be passed to an application or function in device 126 or a network component for display to the operator (block 512). Otherwise, if it is determined not to pass the received biometric identification information to another application for display, biometric information reader 136 can read the biometric identification information and display the biometric identification information to the operator with GUI 138. In addition, GUI 138 may display network packet data such as the network packet's source address, destination address, protocol type, or any other suitable type of data associated with the network packet. By displaying the biometric identification information to the operator, the operator may be able to associate the network packet with the biometric identification information of the network user that originated the network packet.

Figure 6:
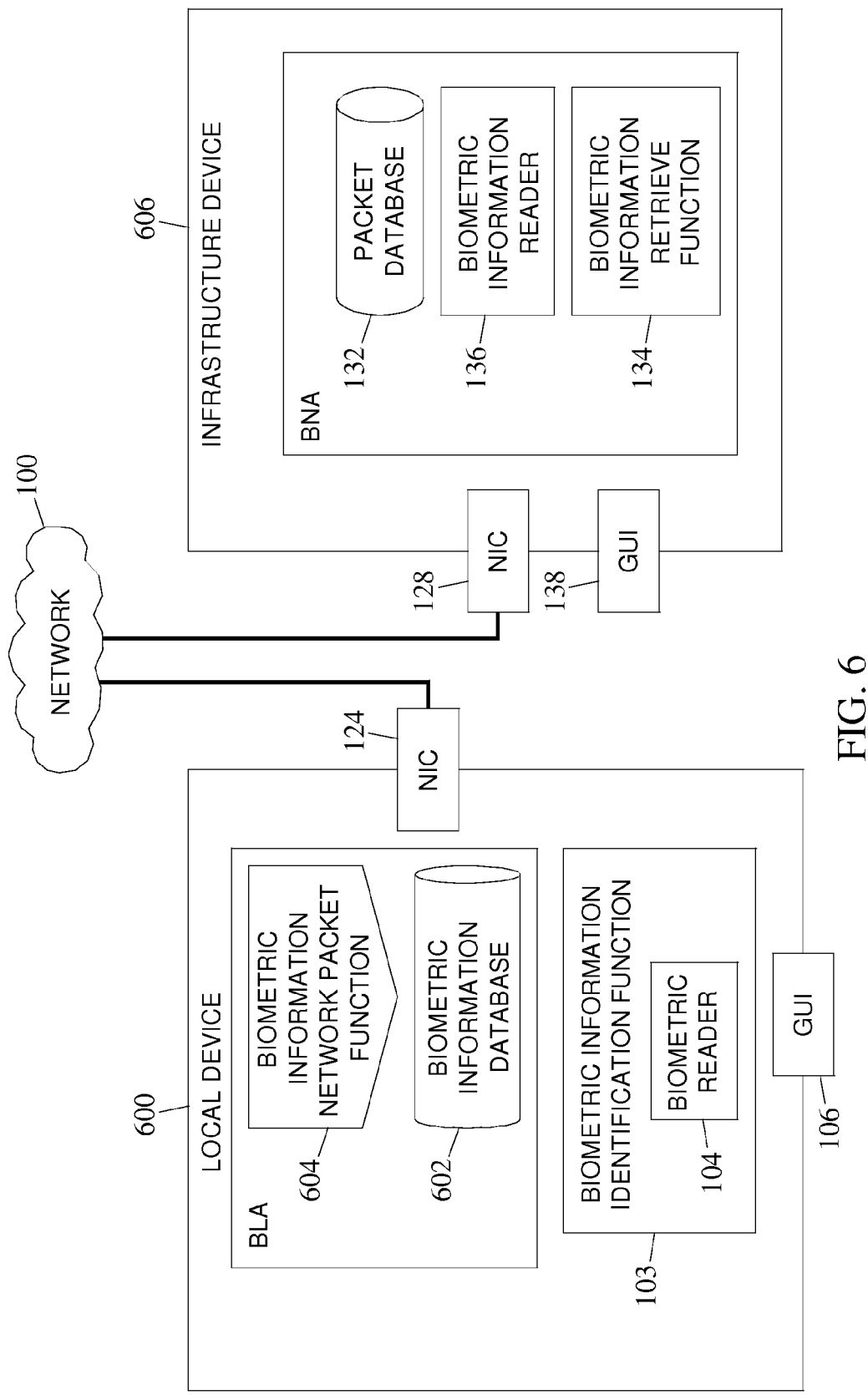
FIG. 6 is block diagram illustrating exemplary network components for associating an originator of a network packet with the network packet using biometric identification information according to an embodiment of the subject matter described herein.

As stated above, in one example of the subject matter described herein, biometric identification information may be inserted in the payload of a network packet. Further, a biometric information identifier may be inserted in the network packet's header for indicating that the biometric identification information is in the payload. FIG. 6 illustrates another example of network components for associating an originator of a network packet with the network packet using biometric identification information according to an embodiment of the subject matter described herein. Referring to FIG. 6, network 100 includes means for reading biometric identification information for a network user and performing an action in the network involving the biometric identification information. For example, local device 600 may include biometric reader 104 for reading biometric identification information for a network user. The biometric identification information may be obtained from the network user when the network user uses GUI 106 to enter user credentials.

Device 600 may store the biometric identification information and user credentials in a biometric information database 602. A biometric information network packet function 604 may also generate a unique biometric information identifier for the network user. The biometric information identifier may be stored in database 602 with biometric identification information and user credentials. When a network packet is originated by the network user, the biometric identification information for the network user may be inserted into the network packet's payload. In addition, the biometric information identifier may be inserted in the network packet's header as an indicator that the biometric identification information is in the payload. The network packet may then be communicated onto network 100 via NIC 124.

Network 100 may include an infrastructure device 606 for receiving the network packet communicated onto network 100. Device 606 may include NIC 128 for receiving the network packet from network 100. Biometric information retrieve function 134 is operable to analyze the network packet and read the biometric information identifier from the header of the network packet. Based on the read identifier, function 134 will know that the payload of the network packet includes biometric identification information of the originator of the network packet. Function 134 may read the biometric identification information from the network packet's payload and pass the information to biometric information reader 136 or another suitable application for displaying the biometric identification information to the operator of device 606. Biometric information reader 136 may use GUI 138 for displaying the biometric identification information to the operator. Alternatively, any of the actions described above involving the biometric information may be performed.

Packet database 132 may store the biometric identification read from the packet and data from the network packet. For example, an entry in database 132 may include network packet data, such as source destination address, or protocol type, and the biometric identification information read from the packet. The operator of device 606 may then access the entry for associating the originator of the network packet with the network packet by using the biometric identification information.

As discussed above, in an alternate example of the subject matter described herein, biometric identification information may be inserted into a network packet header for associating an originator of a network packet with the network packet. For example, local device 600 may obtain biometric identification information from the network user when the network user uses GUI 106 to enter user credentials. When a network packet is originated by the network user, the biometric identification information for the network user may be inserted into the network packet's header or trailer. The network packet may then be communicated to network 100 and received by device 606. Function 134 may detect and read the biometric identification information from the network packet's header or trailer. The read information and other network packet data may be stored in database 132. The operator of device 606 may then access the entry for associating the originator of the network packet with the network packet by using the biometric identification information.

The following scenarios illustrate examples of associating an originator of a network packet with the network packet using biometric information according to embodiments of the subject matter described herein:

Scenario A: Biometric Data is Pre-Stored in a Centralized Database
  i. Bob is a new employee on his first day at work for XYZ Company. Bob is going through the process for a network user account.
  ii. Bob has his digital image taken with a digital camera.
  iii. The network administrator enters Bob's image into a centralized relational database. This database may be referenced by links inserted into network packets according to the subject matter described herein so that the biometric information may be better protected and as a measure of efficiency.
  iv. The network administrator also creates a user account and password for Bob. The user account is also entered into the relational database so that it can be associated with Bob's digital image.
  v. After the network administrator has completed inputting the data for Bob's entry, an identifier is generated to Bob's biometric identification information. The identifier may be inserted into network traffic generated by Bob's computer.
  vi. Bob receives his account information and goes to his office.
  vii. Bob logs onto the network. While being authenticated, the identifier to his biometric information is communicated to an agent local to Bob's computer.
  viii. Bob is now authenticated and all traffic he generates includes an identifier to the database where his digital image is stored.

Scenario B: Biometric Data is Stored Locally
  i. Bob enters his user credentials into his computer at work.
  ii. The computer captures Bob's digital image.
  iii. The computer denies network access until Bob is authenticated and his digital image is stored. Bob's instant messenger contact information may also be stored in the database so that it is available to anyone who analyzes network traffic.
  iv. Bob is authenticated and allowed network access.
  v. Network traffic generated by the computer that Bob is using is modified so that an identifier to his digital image is included with each packet.
  vi. Bob uses his computer to start a remote connection to a server that he has been provided access.
  vii. Bob's remote computer is infected with the "Lovesan" worm. Since Bob's access to the server included a new firewall rule, the worm now has access to a new network.
  viii. The administrator of the server that Bob is connected to notices Bob's session because the host based intrusion detection system (HIDS) on the server alerts that it is being attacked.
  ix. The subject matter described herein may be used to detect an identifier in the packet to a user image database. A browser may be launched to display the identifier.
  x. The administrator views the browser which displays the image of Bob and his instant messenger contact information.

xi. The administrator contacts Bob via instant messenger and asks him to disconnect his remote computer from the network so that the "Lovesan" worm may be removed.

Scenario C: Network Analysis Usage Billing i. Division 123 of Company ABC has been having throughput issues since a new department was brought onto their network segment.

ii. The network administrator brings this problem to the attention of a site manager and they discuss the possibility that the additional users have pushed network capacity to the maximum limits. However, adding new capacity will be costly and the site manager does not have the budget so he asks the network administrator to conduct a study of the network usage.

iii. The network administrator decides to use a network analysis tool that uses the subject matter described herein. According to the subject matter described herein, every network user's fingerprint scan is associated with the network traffic generated by the network user originating the network traffic. The fingerprint scan may be associated with network traffic generated by any network component that the network user utilizes.

iv. The network administrator may let the network analysis tool collect network traffic data for a few days.

v. The network administrator may run a report for the collected data.

vi. The network administrator may initiate queries and sorts on the fingerprint scan information and protocol type.

vii. The report may show that there is a large amount of FTP traffic between the new department members and another division of ABC Company. The report may be beneficial because IP or port information in the network would not have allowed the network administrator to identify the new department users as being the extra load on the network.

viii. The network administrator may report the information to the site manager. The site manager may show the results to the ABC Company CIO. The CIO may provide authorization for an increased budget that is charged to the new department.

According to one enhancement, the subject matter described herein may be imbedded in an operating system of a device using the subject matter described herein.

In a further enhancement, the subject matter described herein may be part of a shared/network application. In this enhancement, each user logs into the shared application with a unique account and packets are tagged with biometric identification information.

In yet another enhancement, the subject matter described herein may be split for a multi-tiered architecture to accommodate legacy equipment and operating systems on devices such as firewalls, mobile telephones, etc.

In a further enhancement, the subject matter described herein may be a network device registration tool.

In another enhancement, the subject matter described herein may be part of a technique of controlling user access to network resources. For example, firewall rules may be based upon the user related biometric information rather than an IP address.

In a further enhancement, the subject matter described herein may be linked to a central database of users such as with lightweight directory access protocol (LDAP).

In yet another enhancement, the subject matter described herein may be used for usage billing.

In a further enhancement, the subject matter described herein may be used to capture other different combinations of biometric identification data, such as a digital photograph and a fingerprint scan.

In another enhancement, the subject matter described herein may relay on biometric reader systems to ensure that acceptable information is collected. This enhancement may ensure that a network user is not providing false or incomplete biometric identification information.

In a further enhancement, the biometric identification information according to the subject matter described herein may be represented by a hash or digital signature.

Network packets according to the subject matter described herein may be sent by using any suitable network protocol. Exemplary network protocols for use with the subject matter described herein include Ethernet, ATM, IP version 4 (IPv4), IP version 6 (IPv6), TCP, UDP, MPLS, etc.

There are several advantages to network users and operators for using the subject matter described herein. For example, the subject matter described herein provides an easy method that a network user or operator may identify the source of network traffic by displaying biometric identification of the network user originating the network traffic. In another example, the subject matter described herein provides network users and operators the ability to associate network traffic with an originator of the network traffic by using biometric identification information of the originator regardless of the network device being used. Further, in another example, the subject matter described herein provides the ability for a network user or operator to detect the actual person generating network traffic even if persons use the same network account login. In yet another example, the subject matter described herein provides a way to identify network users who are abusing network privileges. In another example, the subject matter described herein may detect when no biometric identification information is associated with network traffic for providing an instant indication of unauthorized network traffic. In yet another example, the subject matter described herein enables a more efficient way to locate rogue device owners. In another example, the subject matter described herein provides the capability to distinguish system device traffic from that of network users. In yet another example, the subject matter described herein provides a way to distinguish the traffic of individual users located behind a network address translation (NAT) device.

It will be understood that various details of the subject matter described herein may be changed without departing from the scope of the subject matter described herein. Furthermore, the foregoing description is for the purpose of illustration only, and not for the purpose of limitation.

What is claimed is:

1. A method for determining an originator of a network packet using biometric information, the method comprising:

receiving a network packet from a network device;

analyzing at least one of a header and a trailer of the network packet to determine whether the at least one of a header and a trailer includes an identifier of biometric identification information of a network user; and identifying the network packet as having originated from the network user if the header or trailer includes the identifier of biometric identification information of the network user, wherein identifying the network packet as having originated from the network user does not require reading a payload of the packet.

2. The method of claim 1 wherein the identifier of biometric identification information identifies a fingerprint, an eye retina, an eye iris, a facial pattern, a voice pattern, or a hand measurement.

3. The method of claim 1 wherein the identifier of the biometric identification information includes user credentials of the network user.

4. The method of claim 1 wherein the identifier of biometric identification information links to stored biometric identification information.

5. The method of claim 1 wherein the identifier of biometric identification information includes a hash of the biometric identification information in the network packet.

6. The method of claim 1 wherein the identifier of biometric identification information indicates that the biometric identification information is in the payload of the network packet.

7. The method of claim 1 comprising retrieving the biometric identification information based on the biometric information identifier.

8. The method of claim 1 comprising performing an action in the network involving the biometric identification information.

9. The method of claim 8 wherein performing an action involving the biometric identification information includes at least one of:
   providing a notification indicating receipt of a network packet associated with the network user;
   displaying the biometric identification information on a display in the network;
   logging the biometric identification information in a log file;
   performing packet traffic analysis based on the biometric identification information;
   establishing a communication session with a communication address associated with the biometric identification information;
   removing the biometric identification information from the network packet; and
   removing the biometric information identifier from the network packet.

10. A system for determining an originator of a network packet using biometric information, the system comprising:
   a network interface configured for receiving a network packet from a network device; and
   a biometric information retrieve function configured for:
      analyzing at least one of a header and a trailer of the network packet to determine whether the at least one of a header and a trailer includes an identifier of biometric identification information of a network user; and
      identifying the network packet as having originated from the network user if the header or trailer includes the identifier of biometric identification information of the network user, wherein identifying the network packet as having originated from the network user does not require reading a payload of the packet.

11. The system of claim 10 wherein the biometric information retrieve function is configured for analyzing the at least one of a header and a trailer of the network packet to determine whether the biometric identification identifier identifies biometric identification information that identifies a fingerprint, an eye retina, an eye iris, a facial pattern, a voice pattern, or a hand measurement.

12. The system of claim 10 wherein the biometric information retrieve function is configured for analyzing the at least one of a header and a trailer of the network packet to determine whether the biometric identification identifier includes user credentials of the network user.

13. The system of claim 10 wherein the biometric information retrieve function is configured for analyzing the at least one of a header and a trailer of the network packet to determine whether the biometric identification identifier includes a link to stored biometric identification information.

14. The system of claim 10 wherein the biometric information retrieve function is configured for analyzing the at least one of a header and a trailer of the network packet to determine whether the biometric identification identifier includes a hash of the biometric identification information.

15. The system of claim 10 wherein the biometric information retrieve function is configured for analyzing the at least one of a header and a trailer of the network packet to determine whether the biometric identification identifier indicates that the biometric identification information is in the payload of the network packet.

16. The system of claim 10 wherein the biometric information retrieve function is configured for retrieving the stored biometric identification information based on the biometric information identifier.

17. The system of claim 10 wherein the biometric information retrieve function is configured for performing an action in the network involving the biometric identification information.

18. The system of claim 17 wherein performing an action involving the biometric identification information includes at least one of:
   providing a notification indicating receipt of a network packet associated with the network user;
   displaying the biometric identification information on a display in the network;
   logging the biometric identification information in a log file;
   performing packet traffic analysis based on the biometric identification information;
   establishing a communication session with a communication address associated with the biometric identification information;
   removing the biometric identification information from the network packet; and
   removing the biometric information identifier from the network packet.

19. A system for determining an originator of a network packet using biometric information, the system comprising:
   means for receiving a network packet from a network device;
   means for analyzing at least one of a header and a trailer of the network packet to determine whether the at least one of a header and a trailer includes an identifier of biometric identification information of a network user; and
   means for identifying the network packet as having originated from the network user if the header or trailer includes the identifier of biometric identification information of the network user, wherein identifying the network packet as having originated from the network user does not require reading a payload of the packet.

20. A computer program product comprising computer executable instructions embodied in a tangible computer readable medium for performing steps comprising:
   receiving a network packet from a network device;
   analyzing at least one of a header and a trailer of the network packet to determine whether the at least one of a header and a trailer includes an identifier of biometric identification information of a network user; and identifying the network packet as having originated from the network user if the header or trailer includes the identifier of biometric identification information of the network user, wherein identifying the network packet as having originated from the network user does not require reading a payload of the packet.

* * * * *